United States Patent
Merola

[11] 3,813,090
[45] *May 28, 1974

[54] CLAMP
[75] Inventor: Anthony Merola, Pittsburgh, Pa.
[73] Assignee: Amerola Products Corporation, Pittsburgh, Pa.
[ * ] Notice: The portion of the term of this patent subsequent to Apr. 4, 1989, has been disclaimed.
[22] Filed: Nov. 10, 1971
[21] Appl. No.: 197,225

Related U.S. Application Data
[63] Continuation-in-part of Ser. No. 825,369, May 16, 1969, Pat. No. 3,653,708.

[52] U.S. Cl. ........... 269/217, 24/257 R, 24/134 CP, 292/261, 269/218, 269/135
[51] Int. Cl. ........................ B25b 1/04, A44b 21/00
[58] Field of Search ....... 29/628, 630 F; 294/102 R, 294/114; 24/134 CP, 134 M, 257 A, 257 R, 126 B, 136 A, 244, 255 R; 269/137, 321 W, 321 WE, 321 N, 135, 217, 218; 279/28, 29; 292/19, 20, 252, 261, 305

[56] References Cited
UNITED STATES PATENTS

| | | | |
|---|---|---|---|
| 940,728 | 11/1909 | Reece | 24/244 |
| 945,185 | 1/1910 | Milas | 269/37 |
| 2,318,242 | 5/1943 | Matteson | 294/114 |
| 2,544,086 | 3/1951 | Herrington | 24/136 A |
| 2,567,662 | 9/1951 | Claud-Mantle | 292/305 |
| 3,197,250 | 7/1965 | Trotta | 294/102 |
| 3,653,708 | 4/1972 | Merola | 294/102 R |
| 3,711,154 | 9/1971 | Merola | 24/244 X |

*Primary Examiner*—Al Lawrence Smith
*Assistant Examiner*—Gary L. Smith
*Attorney, Agent, or Firm*—Parmalee, Miller, Welsh & Kratz

[57] ABSTRACT

A clamp which provides a secure grip upon a workpiece. The clamp has a frame and a pair of spaced plate members which form confronting, converging roller surfaces. Friction rollers, one associated with the roller surface and resiliently secured thereto so that the distance between the rollers may be enlarged to engage the object to be clamped, but will securely hold the object against removal from the grip of the rollers if forces are extended in the direction of convergence of the roller surfaces. The use of two adjacent such clamps, with the roller surfaces of each clamp converging in a different direction provides a junction for wires or other objects, and acts as a splicing unit.

10 Claims, 4 Drawing Figures

PATENTED MAY 28 1974　　　　　　　　　　　　　　　3,813,090

CLAMP

REFERENCE TO RELATED APPLICATION

This application is a continuation-in-part of copending application Ser. No. 825,369 entitled "Gripping Device," filed May 16, 1969 by the present inventor, which issued Apr. 4, 1972 as U.S. Pat. No. 3,653,708 the teachings of which are incorporated by reference herein.

BACKGROUND OF THE INVENTION

In applicant's U.S. Pat. No. 3,653,708, the teachings of which are incorporated by reference herein. There is described a gripping device and a carrying device which is usable to lift objects without exerting upon the object any more pressure than that required to offset the gravitational pull exerted on the object. The device described therein, when adapted according to the present invention, provides a clamp or splicing unit as more specifically defined hereinafter. The present device is usable for clamping and restraining wires, ropes and other objects, such a projections from a large object, that are to be held in a stationary position while providing for easy release of the object when such restraint is no longer desired. By using a pair of such clamp units, the device may be used to hold two wires, or the like, to which forces are applied in different directions, so as to form a junction or splice for either temporary or permanent retention of the wires.

BRIEF SUMMARY OF THE INVENTION

A clamp has a support or frame member and a pair of plate members which constitute confronting, converging plate members that terminate in spaced relationship. A roller is associated with each roller surface and is resiliently secured thereto. In rest position the rollers generally confront each other in a parallel manner while the resilient means enables opening a space between the rollers through urging of the rollers along the surfaces in the direction of divergence of the surfaces. The rollers provide a secure clamping action upon an object urged therebetween and, upon exerting force on the object in the direction of convergence of the rollers, the clamping force is increased. By providing a pair of adjacent such clamps with the terminals of the two pairs of plate members facing each other, an efficient junction is provided for wires and ropes or the like whereby the same can be restrained while a splicing, tying, or other fastening of the wires is obtained. To remove an object from the clamp, the object may be moved in the direction coaxial to the axes of the rollers, or the rollers may be urged in the direction of divergence of the roller surfaces, such as by a lever, so as to release the object.

BRIEF DESCRIPTION OF THE DRAWINGS

FIG. 2 is a view of another embodiment of the clamp of the present invention where the clamp is attached to a support for use in a clothesline holder or the like;

DETAILED DESCRIPTION

Figure 1:
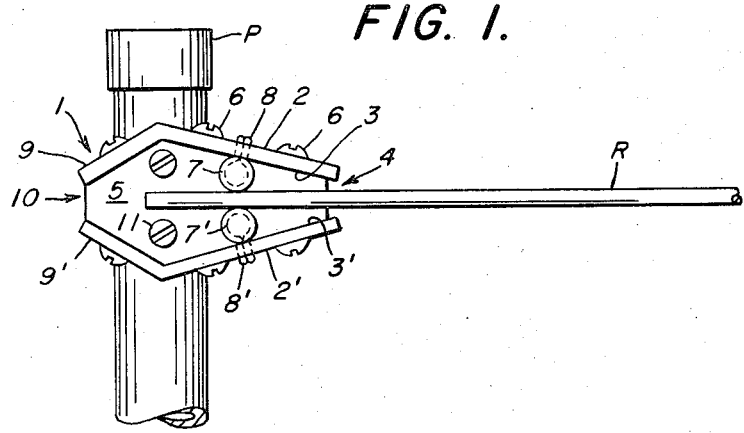
FIG. 1 is a view of the clamp of the present invention wherein the clamp is attached to a pole or the like and used as a terminal or restraining device for a wire or line.

As illustrated in FIG. 1, the clamp of the present invention is used as a wire or rope clamp. As shown, the clamp 1, comprises a frame member having a pair of confronting, converging plate members 2 and 2' which form roller surfaces 3 and 3', the roller surfaces terminating in spaced relationship to leave an opening 4 therebetween, through which opening the object to be clamped passes. The plate members 2 and 2' are supported by a support plate 5 and extend in a direction generally normal to the support plate. Bolts or other fastening means 6 are used to secure the plate members to the support plate, although the entire frame may be cast or molded of metal or other material. Attached to each roller surface 3 and 3' are friction rollers 7 and 7', which rollers are so attached by resilient means 8 and 8', illustrated as rubber bands or strips. The resilient means connects its respective roller to an associated roller surface so that, in rest position, the rollers are in confronting relationship. The resilient means bias the rollers in the direction perpendicular to the roller surface, but enable rolling of the roller along the surface through the resiliency of the bands 8 and 8'.

The plate members 2 and 2' may have an acute angle and converge at the end opposite the opening 4, if desired, to form a compact and protected clamp, such as at portions 9 and 9' of the plate members and provide an opening 10 at the end of the clamp opposite opening 4. The clamp may be attached to a pole P or the like, such as by screws or other fastening means 11. In operation, the object to be secured, such as a wire or rope, R, is urged between the rollers 7 and 7', preferably by feeding the rope through the opening 4. Or the rope may be urged between the rollers by a movement in the direction of divergence of the surfaces 3 and 3' and in the direction of the support plate 5 so that the rope is urged between the rollers. The rope is immediately grasped by the rollers and any movement or attempt to pull the rope from the clamp in the direction of convergence of the surfaces 3 and 3' will only serve to tighten the grip of the rollers 7 and 7' upon the rope. This is because the rope urges the rollers 7 and 7' in the direction of divergence of the surfaces 3 and 3'. The thickness of the rope is at least as great as the spacing between the rollers. The rollers 7 and 7' roll on the surfaces 3 and 3' in a direction of divergence of the surfaces 3 and 3' but, because of resilient means 8 and 8', will frictionally secure the rope. Any movement of the rope in the direction of convergence of the surfaces 3 and 3' will cause the rollers 7 and 7' to roll in the direction of the convergence of the surfaces 3 and 3' thus causing a tighter grip on the rope. When holding a rope such as illustrated in FIG. 1, the tautness of the rope will cause movement of the rollers in the direction of convergence of the surfaces 3 and 3' and, thus, cause a more secure clamping thereof by the clamp.

When it is desired to remove the rope from the clamp, the rope may be moved in the direction coaxial with the axes of the rollers, i.e., away from support plate 5, and slipped from between the rollers 7 and 7'. Or the rollers may be urged, either mechanically or manually, in the direction of divergence of the surfaces 3 and 3' so that the distance between the rollers is enlarged and the rope is released from the friction grip of the rollers and can be withdrawn through opening 4.

Figure 2:
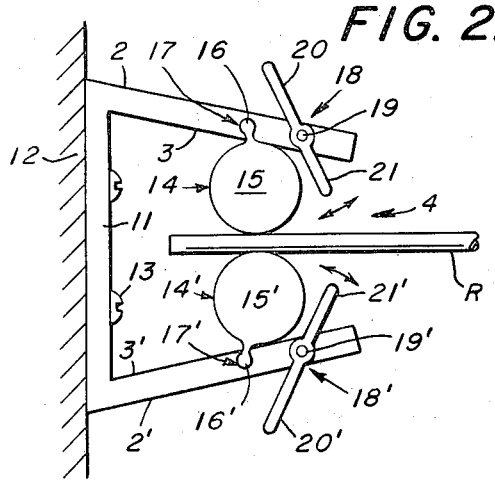

The embodiment shown in FIG. 2 illustrates a similar type of wire or rope-holding device where the confronting, converging plate members 2 and 2', which constitute roller surfaces 3 and 3', depend from a support plate or bridge member 11 that is fixed to a wall 12 or other support by means of screws 13 and which extends between the plate members 2 and 2' in a position opposite opening 4. The friction rollers are illustrated as another embodiment of roller wherein the roller and the resilient means are an integral unit. The roller 14 has a generally cylindrical portion 15 and an integral resilient means or appendage 16, which appendage is secured within a channel or groove 17 in the plate member 2. Such an integral unitary roller and resilient means construction is described in copending application Ser. No. 197,223 entitled "Adjustable Material Handling Device," filed Nov. 10, 1971 by the present inventor now U.S. Pat. No. 3,771,826. The roller 14' is fabricated in a similar manner and its appendage 16' secured within the groove 17' in plate member 3'. The rope R may be secured within the clamp as above described, either by inserting it through opening 4 and between rollers 14 and 14' or by sliding the rope between the rollers in the directions parallel to the axes of the rollers.

A release means is shown in FIG. 2 where pivotal levers 18 and 18' are provided. The lever 18 is pivoted at pivot 19 and by urging the roller 14, by pressing on portion 20 of the lever in the direction of convergence of the plate members 2 and 2', the portion 21 of the lever will force the roller 14 in the direction of divergence of the plates 2 and 2'. By exerting a force on lever 18' in a similar manner, the rollers 14 and 14' will be urged towards support plate 11 and the spacing between the rollers enlarged so that the rope will be released from frictional engagement. Or, as previously described, the rope may be removed from the rollers 14 and 14' by moving the rope in the direction of the axes of the rollers until it slides from between the rollers.

Figure 3:
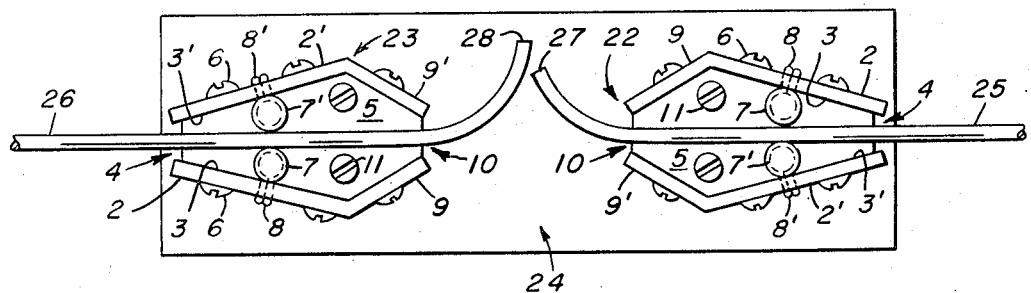
FIG. 3 is a plan view of another embodiment of the clamp of the present invention where two such clamps are provided adjacent each other on a support and usable as a juncture or splicing device.

In FIG. 3 there is illustrated a further embodiment of the invention wherein two clamp units are attached to a support and the combination is usable as a splicing device. As shown, two clamp units 22 and 23 are provided on a support 24. Both of these units are similar to the clamp unit illustrated in FIG. 1 and like numerals are used to designate like parts. The unit 23 is a duplicate of unit 22, except that it has been rotated 180° so that the openings 4 which are formed at the terminals of the converging rollers plates 2 and 2' face in opposite directions. In effect, clamp 23 is a mirror image of clamp 22.

The splicing unit or juncture described operates in the following manner. With a wire or other object in separate parts 25 and 26, the separate parts are clamped within the splicing unit as shown. Part 25 is fed between rollers 7 and 7' of clamp 22, with the terminus 27 passed through the opening 10 so as to be free of the clamp and situated for the operator to attend. Part 26 is then fed between rollers 7 and 7' of clamp 23, and its terminus 28 is passed through opening 10 of the clamp 23 so that the terminus 28 and the terminus 27 are adjacent each other for tying, welding or otherwise affixing the two parts 25 and 26 together. The splicing unit may also operate as a juncture, either temporary or permanent. Even if parts 25 and 26 are not separated but form a continuous wire, the unit may be used to take up slack in the line by pulling the parts together intermediate clamps 22 and 23 so that a loop of excess wire is present between the clamps, and the rollers will prevent the slippage of the wire forming said loop from the area between the clamps. Such a juncture is useful on fencing, telephone or telegraph lines, and other wire or rope devices where slack in the lines results from stretching of the line after prolonged usabe and stress on the line.

Figure 4:
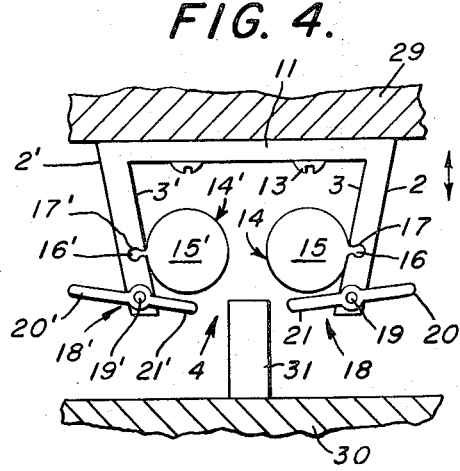
FIG. 4 is a further embodiment of the invention where the clamp is used as a latch or locking means.

The embodiment of the clamp illustrated in FIG. 4 shows the clamp in use as a lock or latch. The embodiment shown therein is a clamp similar to that shown in FIG. 2. The clamp, with its support plate 11, may be affixed by screws 13 or other fastening means to a car hood, sliding door, or other movable element 29. The clamp is movable into position so as to engage with a second element 30 which may be in fixed position and which has a protrusion 31, the protrusion 31 being engageable between the rollers 14 and 14'. By lowering element 29 with its clamp attached thereto, the rollers 14 and 14' will engage the latch 31 and attempts to separate the latch from the roller by lifting element 29 will only serve to increase the grip of the rollers on the latch. To release the latch, the pivotal levers 18 and 18' are moved so as to urge the rollers 14 and 14' away from opening 4 and thus increase the spacing between them so that their frictional grip on the latch 31 is released. The clamp may, of course, be attached to a fixed element and the latch carried by a movable element, or both the clamp and latch may be attached to movable elements, whereby they are engageable to lock two elements together.

I claim:
1. A clamp comprising:
   a. a frame member having a pair of confronting, converging plate members constituting roller surfaces terminating in spaced relation to each other to provide an opening for admitting a workpiece therebetween;
   b. a pair of friction rollers, one associated with each confronting roller surface; and
   c. resilient means directly connecting each of the rollers to its associated roller surface in opposed parallel relationship to each other, and biasing each roller against its associated roller surface, in the direction perpendicular to the surface when the rollers are at rest position, the resilient means, in conjunction with associated roller surfaces, constituting the sole support for the rollers on the frame, the arrangement further being such that, upon insertion of a workpiece through the opening into engagement with the rollers, the resilient means will bias the rollers simultaneously against both the workpiece and the roller surfaces to frictionally engage the workpiece whereby forces acting to separate the workpiece from between the rollers, in a direction perpendicular to the roller axes and in the direction of convergence of the plate members, will increase the gripping force applied by the rollers co-acting with the frame.

2. A clamp as defined in claim 1 wherein each converging plate member is attached to a base member in a plane generally normal to said base.

3. A clamp as defined in claim 1 wherein each converging plate member depends from a base member, with said plates fixed to said base member at their ends opposite said opening.

4. The clamp as defined in claim 1 wherein release means is provided thereon to urge the rollers in the direction of divergence of said surfaces to release a workpiece from engagement with the rollers.

5. A clamp as defined in claim 1 in combination with a latch means, whereby said clamp is affixed to one member, to be latched to a second member, and wherein said latch means comprises a protrusion extending from said second member, and wherein said protrusion is arranged to be frictionally engaged by said rollers upon bringing said first and second members into latching engagement.

6. The clamp as defined in claim 5 wherein release means is provided thereon to urge said rollers in the direction of divergence of said roller surfaces whereby said protrusion will be released from frictional engagement with said rollers.

7. A clamp comprising:
 a. a frame member having first and second pairs of confronting, converging plate members constituting roller surfaces, each surface of said pair terminating in spaced relation to the other surface of said pair to provide an opening for admitting a workpiece therebetween;
 b. a pair of friction rollers associated with each said first and second roller surfaces, one roller associated with each confronting roller surface; and
 c. resilient means directly connecting each of the rollers to its associated roller surface in opposed parallel relationship to the other roller of each said pair of rollers, and biasing each roller against its associated roller surface, in the direction perpendicular to the surface when the rollers are at rest position, the resilient means, in conjunction with associated roller surface, constituting the sole support for the rollers on the frame, the arrangement further being such that, upon insertion of a workpiece through the opening into enagement with the rollers, the resilient means will bias the rollers simultaneously against both the workpiece and the roller surfaces to frictionally engage the workpiece whereby forces acting to separate the workpiece from between the rollers, in a direction perpendicular to the roller axes and in the direction of convergence of the plate members, will increase the gripping force applied by the rollers co-acting with the frame.

8. A clamp as defined in claim 7 wherein said first and second pairs of confronting converging plate members are attached to a base member in a plane generally normal to said base member.

9. A clamp as defined in claim 8 wherein said frame members are so arranged as to maintain the opening formed by said first pair of plate members facing in the direction opposite the opening formed by said second pair of plate members.

10. A clamp as defined in claim 7 wherein each plate member is an angular plate having an acute angle, with both ends of each angular plate terminating in spaced relation to the confronting angular plate.

* * * * *